Patented Sept. 17, 1940

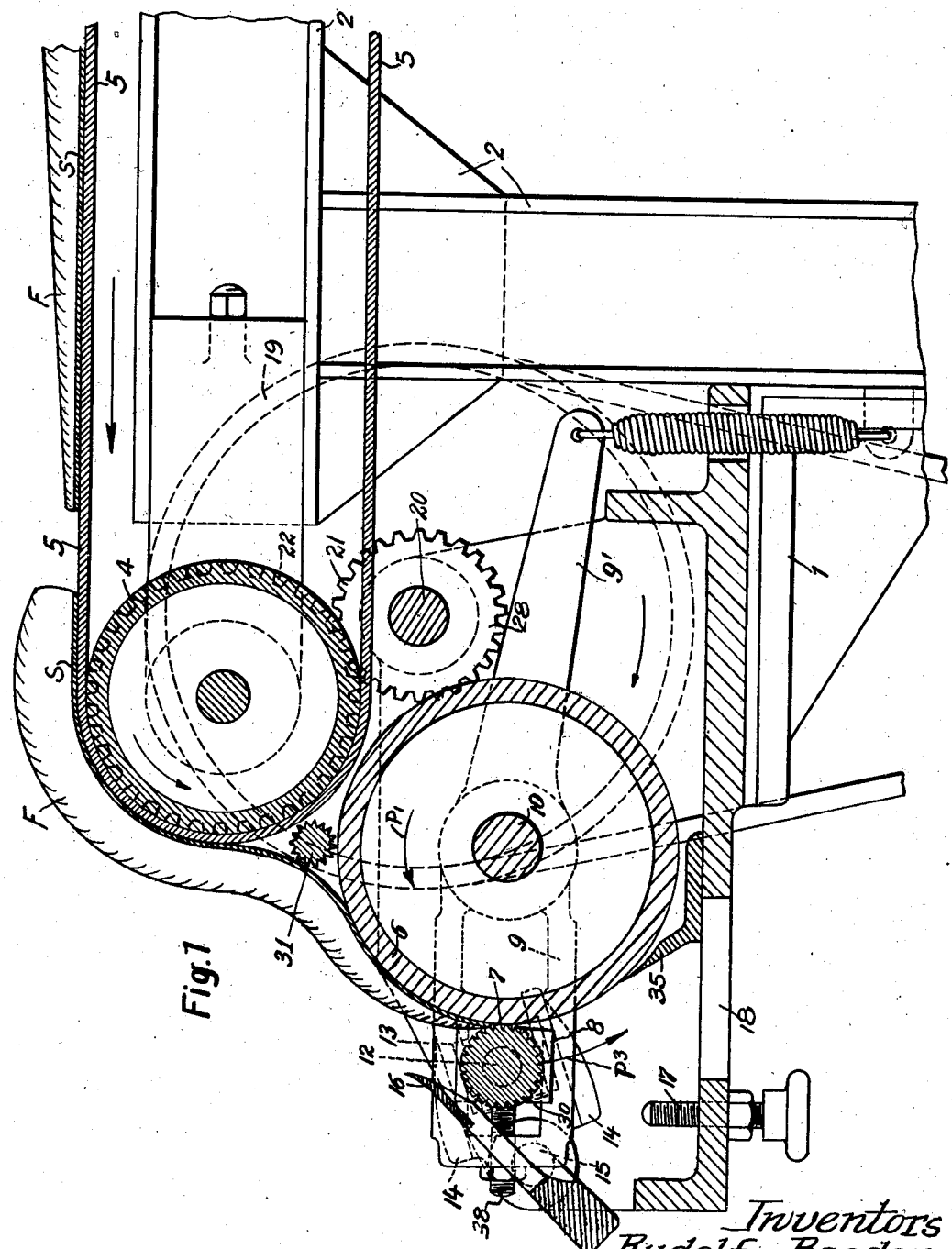

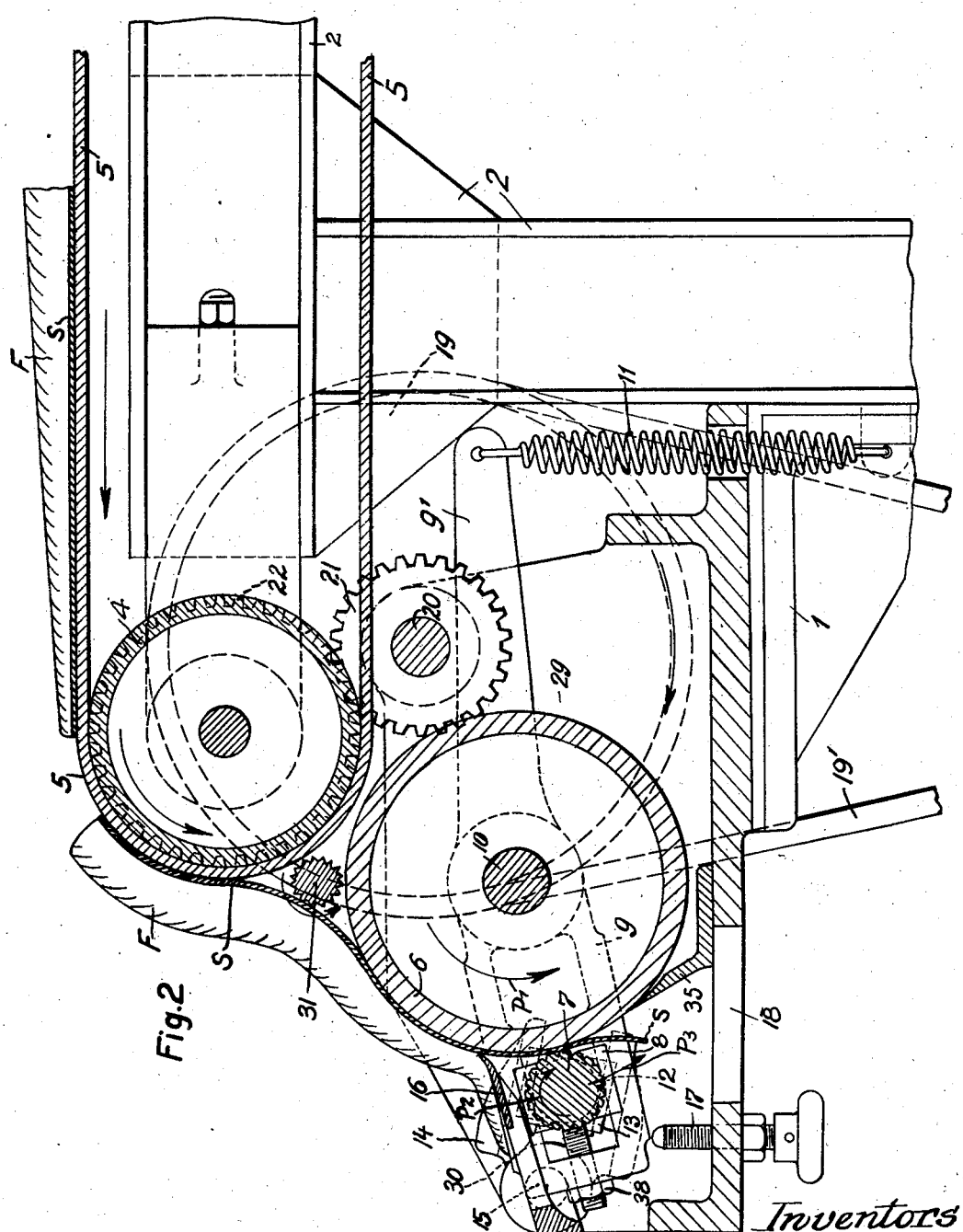

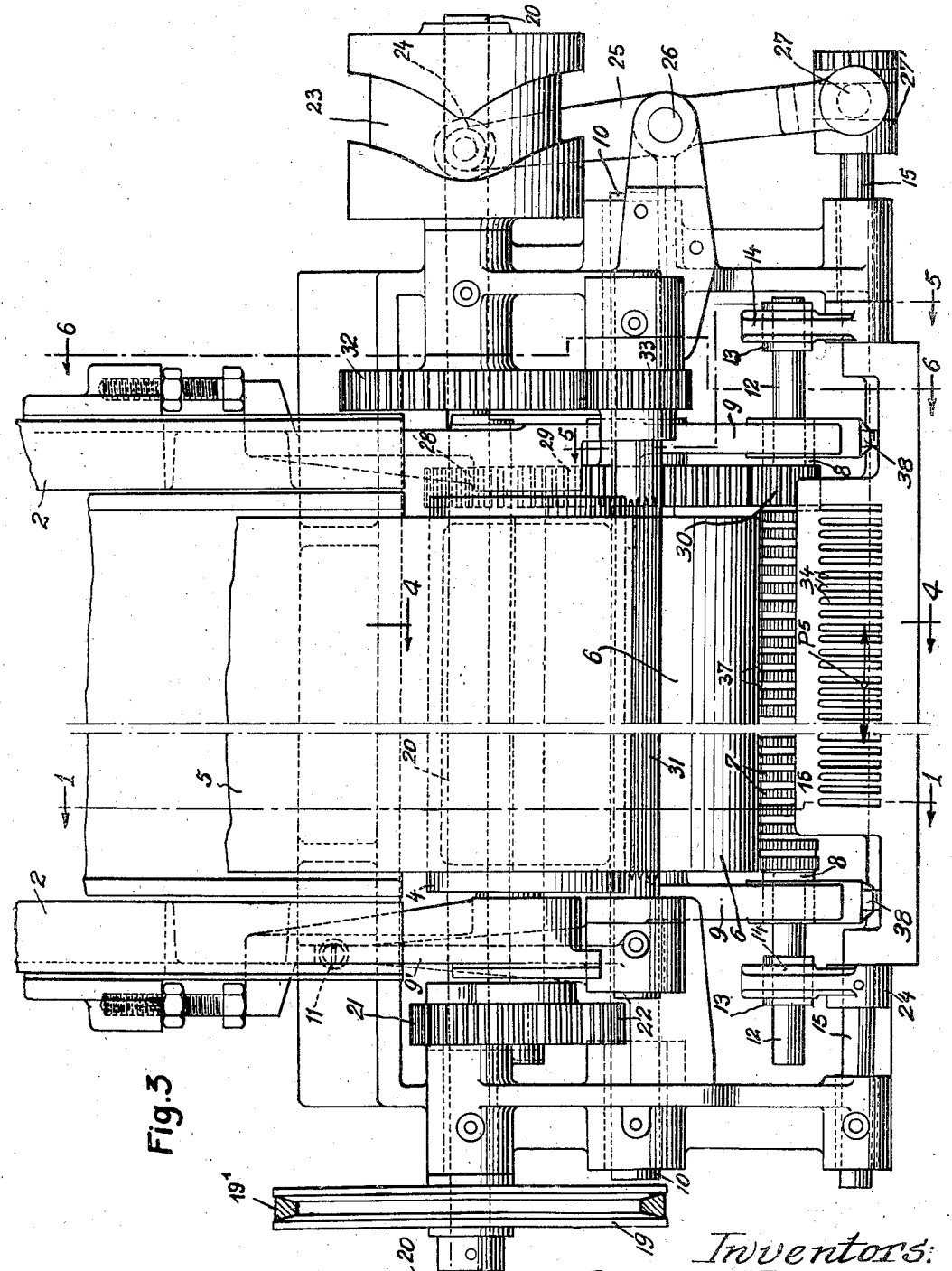

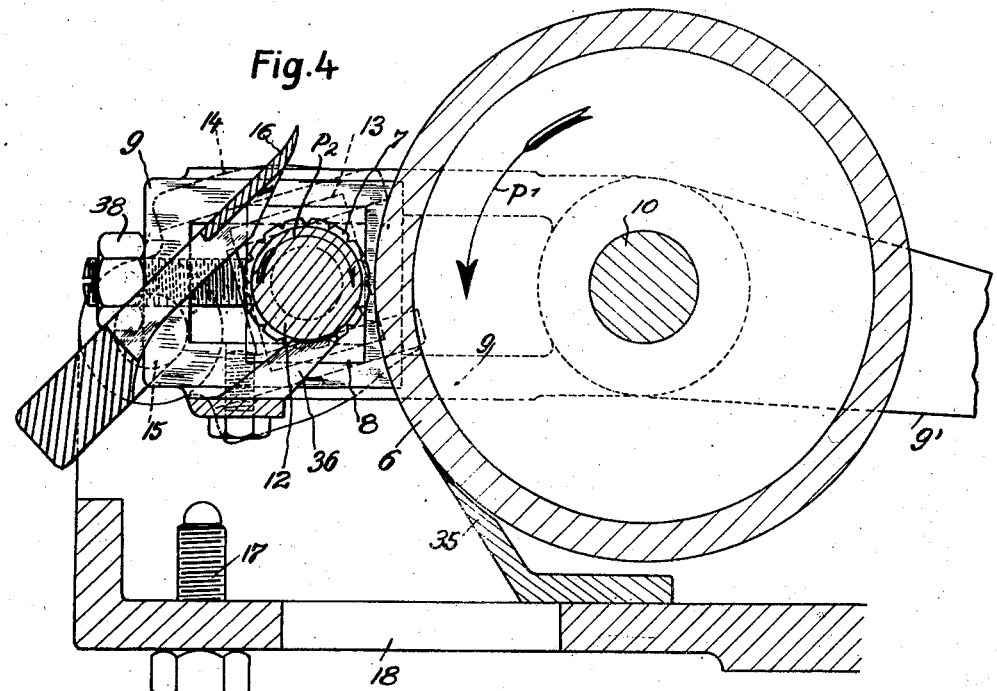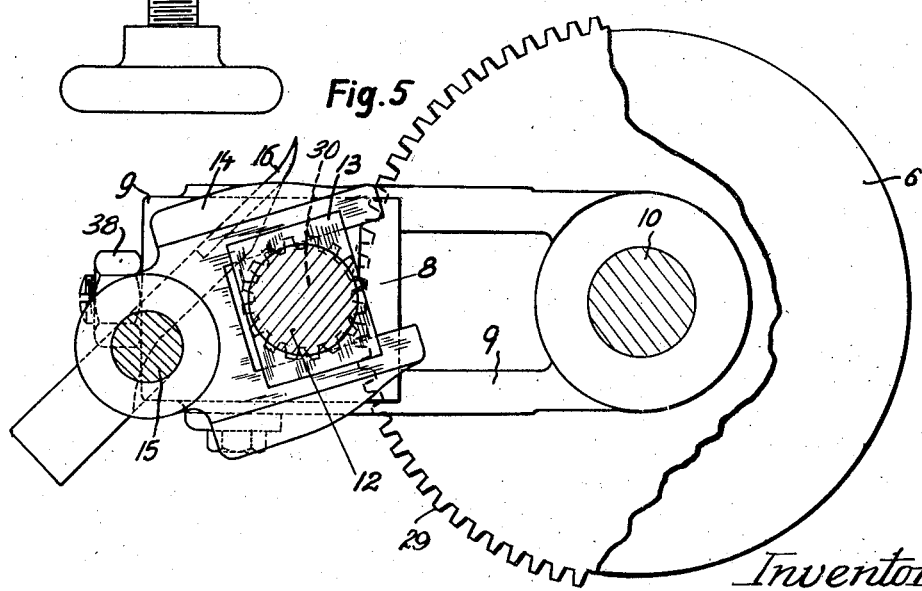

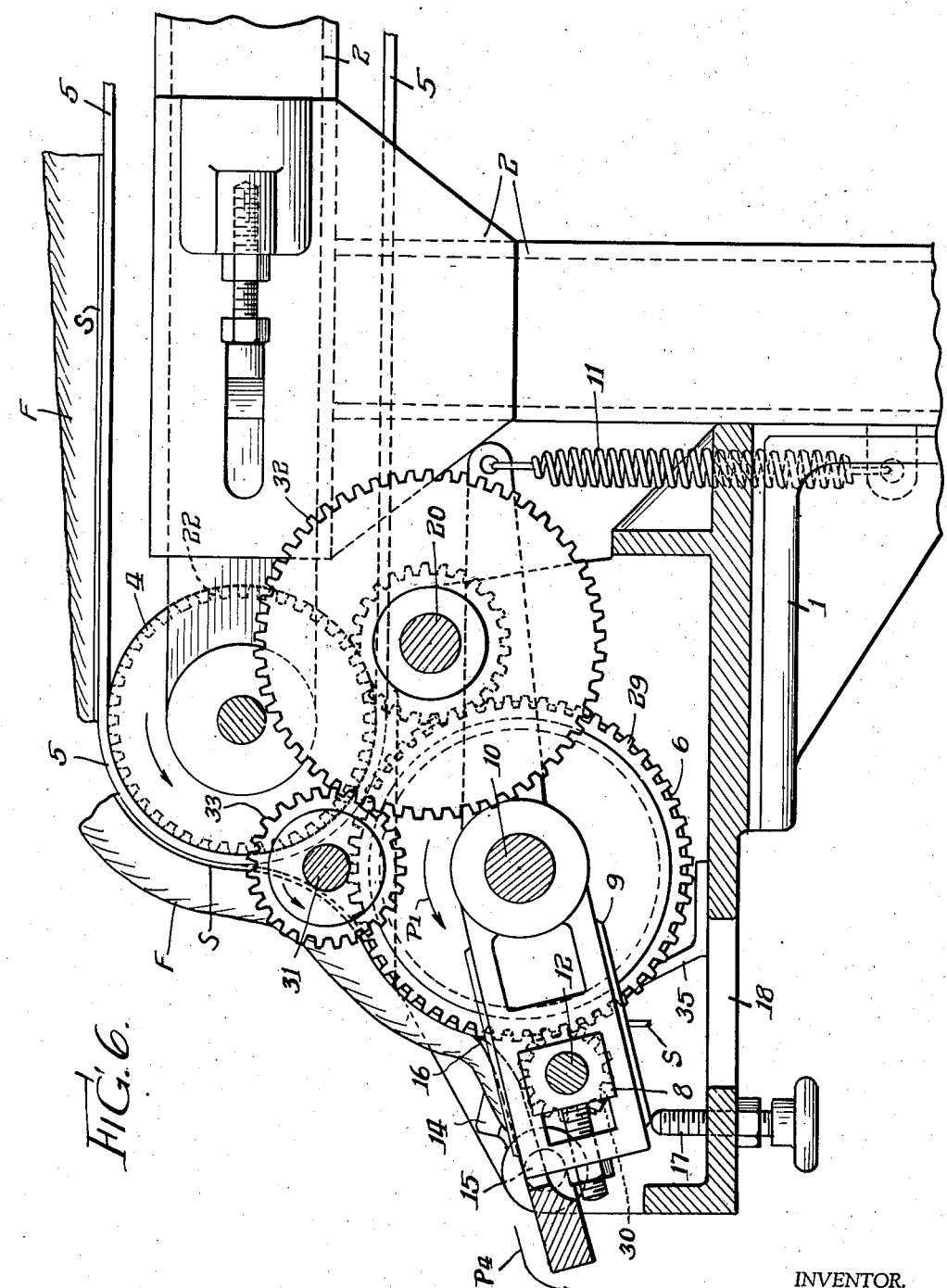

2,215,114

UNITED STATES PATENT OFFICE 2,215,114

FISH FILLET SKINNING MACHINE AND METHOD

Rudolf Baader and Karl Friedrich Schlichting, Lubeck, Germany

Application May 5, 1938, Serial No. 206,250
In Germany July 14, 1937

13 Claims. (Cl. 17—2)

This invention relates to methods of and machines for skinning fish fillets. Hitherto in skinning fish fillets mechanically it has been necessary either to clamp the fillet firmly or to freeze it so as to enable it to resist the pressure of the skinning tool. In neither case is it possible for fish fillets, whether they have been formed in a filleting machine or by hand, simply to be placed on a conveyor freely and in a non-rigid state and then skinned mechanically.

An important object of the invention is to provide a machine in which a fish fillet may simply be placed on a conveyor and thereafter be automatically skinned mechanically. Other objects of the invention include the provision of a skinning mechanism by which a uniform pull is exerted over the whole width of the skin during skinning, the provision of a machine which will cleanly remove the skin from the fillet without simultaneously removing any of the flesh and the provision of means by which the fillet itself clutches a skinning knife into skinning engagement with the fillet.

Our invention will best be understood by the following description of the preferred machine constructed in accordance with it, when taken in conjunction with the annexed drawings, in which:

Figure 1 is a sectional view taken longitudinally of the machine particularly on the line 1—1 of Figure 3 showing the fish and skin being removed;

Figure 2 is a sectional view taken longitudinally of the machine on the same line as Figure 1. Figure 2 discloses the knife and associated parts in operating position to engage a fillet for separating the flesh from the skin, whereas Figure 1 discloses the parts in adjusted position wherein the knife edge is remote from fillet-engaging position;

Figure 3 is a plan view of a machine constructed in accordance with the present invention and without the fish and skin. This figure is drawn to a different scale than Figures 1 and 2;

Figure 4 is a detail sectional view taken on the line 4—4 of Figure 3 and showing the filleting knife and cooperating drum, the overlying portions having been removed to more clearly bring out the construction of the knife controlling parts;

Figure 5 is a view taken on the line 5—5 of Figure 3 and shows in detail the knife supporting and actuating parts, the adjacent parts having been removed to more clearly illustrate the invention, and the gear 29 being shown broken away in order to disclose the adjacent supporting drum structure; and Figure 6 is a sectional view taken through the machine on the line 6—6 of Figure 3 and showing the position of the parts at the time the knife edge is in position engaging a fillet for separating the flesh from the skin.

The machine is supported by a frame comprising vertical and horizontal girders 2 with a propecting end bracket 1. An endless band conveyor 5 runs over rollers 4, one at each end of the machine, only the left-hand roller being shown in the drawings. Fish fillets F are placed by hand with the skin S downwards on the conveyor 5 and are carried by this conveyor to the mechanism shown in the drawings. As the conveyor passes over the end roller 4 the leading end of the fillet tips downwards on to a rotary support roller 6 which is carried by a shaft 10 and which rotates in the direction of the arrow $P^1$, and the fillet is guided on to this roller by a supplementary grooved roller 31.

A skinning knife 16 normally lies in an inoperative position, see Figures 1, 3, 4 and 5, and the arrival of a fillet is used to move this knife into a position in which it removes the skin from the fillet. To this end, the knife is clutched into engagement with the fillet by a clutch which is completed by the fillet itself and which acts also as a clamp to hold the moving fillet during the skinning operation. A grooved roller 7, which rotates in the direction of the arrow $P^2$ and the same peripheral speed as the roller 6, forms part of this clutch. There is a small gap between the rollers 6 and 7 and the advancing end of the fillet enters this gap. The roller 7 is carried by a shaft 12, which is surrounded by two sliding blocks 8, one at each end of the roller, which can slide in rocking arms 9 and which are fixed in position in these arms by set screws 38. The two rocking arms 9 are mounted to rock about the shaft 10, and each has a rearward extension 9' which is subjected to the action of a spring 11. When the end of the fillet is caught between the rollers 6 and 7 pressure is set up and the fillet clutches these two rollers together. In consequence the roller 7 moves with the roller 6, i. e., the roller 7 and the arms 9 rock bodily about the shaft 10 against springs 11, and as the centre of rotation of the roller 7 is the same as that of the roller 6, the latter moves epicentrically around the roller 7.

The shaft 12 also carries two blocks 13, each of which can slide in a fork 14. The forks 14 are fixed to a discontinuous shaft 15 which carries the knife 16. Accordingly, when the rocking roller 7 and its shaft 12 rock, the forks 14 also rock and thus the shaft 15 and knife 16 are rocked. The knife 16 thereupon engages the fillet and in fact cuts through the flesh until it bears against the inside of the skin, the outside of which is in contact with the roller 6, as shown in Figure 2. An adjustable stop 17 is provided to limit the downward rocking of the rocking roller 7 and thus to control the width of the space between the edge of the knife 16 and the surface of the support roller 6. When the roller 7 has rocked downwards and the knife has moved inwards, the rollers 6 and 7 continue to rotate, and they draw the skin between them so that the fillet as a whole is pulled past the knife. The knife stops, however, so that the skin is removed from the fillet by a scraping action. The flesh passes over the top surface of the knife substantially in the direction of the arrow P4 illustrated in Figures 2 and 6, while the skin passes on the other side of the knife edge and finally is delivered through an opening 18 into any suitable receptacle placed beneath the rollers 6 and 7. It will be understood that a suitable receptacle may be situated below the left hand longitudinal margin of the knife casting to receive the skinned pieces of flesh as they are discharged over the margin of the knife as represented more or less diagrammatically by the arrow P4 above. When the skin has passed the rollers, the roller 7 is returned to its initial position by the springs 11.

It will be understood that the only part of the fillet proper that passes through the gap between the rollers 6 and 7 is that which first arrives at the gap and causes the rocking roller 7 and knife 16 to rock. As the gap should be so narrow that the skin in passing through it is firmly gripped by the two rollers, so that the pressure between them is maintained, it may be difficult for the first part of the fillet it pass through the gap. The blocks 8 which carry the roller 7 may therefore be arranged to slide against the action of springs if desired, so that the roller 7 can move back slightly when the fillet first enters the gap.

The drive for all the moving parts is transmitted to a shaft 20 through a pulley 19, which is driven by a driving belt 19'. The shaft 20 drives the conveyor 5 through gear wheels 21 and 22. It also drives the support roller 6 through gear wheels 28 and 29, and the rocking roller 7 is in turn driven from the gear wheel 29 through a gear wheel 30. The supplementary roller 31 that lies in the bight, as clearly shown in Figure 1, between the support roller 7 and the conveyor is driven through gear wheels 32 and 33 from the shaft 20.

A knife that is suitable for scraping the skin off the flesh is not well adapted to cut straight through the flesh to the skin. Such a knife can, however, make the initial cut through the skin successfully if it is reciprocated sideways during the time that it is cutting through the flesh, so that it makes a drawing cut. Provision is made for such reciprocation, and in fact the shaft 20 carries a cylindrical cam 23, in the cam groove of which there runs a roller 24 carried by one arm of a double-armed lever 25 pivoted at 26. The other arm of the lever is forked and carries two pins 27 which engage in a groove in a block 27' on the knife shaft 15, so that this is reciprocated as shown by the arrow P5 in Figure 3.

The upper surface of the knife 16 is grooved as shown at 34 in Figure 3, the grooves preventing the skinned fillet from sticking to the surface of the knife. Below the support roller 6 there is a stripper 35 which serves to remove the skin from the roller. A further stripper 36 is arranged below the rocking roller 7 and is formed with teeth which engage in the grooves 37 of the rocking roller. The stripper 36 is carried by the rocking arms 9 and thus moves with the rocking roller.

The machine described serves to remove skins from fillets so cleanly and with such accuracy that no skin is left on the flesh and no flesh is taken away with the skin. In consequence the skins can be used for the production of leather. It will be observed that the rollers 6 and 7 are wider than the fillets so that they exert a uniform pull over the whole width of the skin. This is an important feature, as the failure of prior skinning mechanisms is thought to be caused at least in part by the fact that they only engage the central part of the skin, leaving the side flaps without adequate tension.

We claim:

1. In the process of skinning fish fillets, the steps of grasping the skin, moving the fillet in a predetermined path, and moving a remotely positioned skinning knife into engagement with the fille to sever the skin therefrom.

2. In a machine for skinning fish fillets, means for grasping a fish fillet and moving it in a predetermined path with the skin adjacent one side of the path, a skinning knife normally remote from the path, and means to bring said skinning knife into said path when the fillet is grasped to sever the skin therefrom.

3. In a machine for skinning fish fillets or the like, means for grasping the fillet and drawing the fillet in a predetermined path, a skinning knife or the like relatively remotely positioned from said path, and means actuated by said grasping means to move the knife into the fillet to a point adjacent the skin to separate the skin from the fillet while the latter is moved in said path.

4. In a machine for skinning fish fillets, means to convey a fillet in a predetermined path, and means in said path for grasping a fillet while moving in said path, said last named means being operatively connected to a remotely positioned knife and being displaceable by contact with said fillet to move said knife into skinning position.

5. A machine for skinning fish fillets including means for supporting and conveying the fish fillet in a predetermined path, a clutch member arranged substantially in said path and spaced from the supporting and conveying member to provide a gap therebetween for grasping the fillet, a skinning knife or the like, and means operatively connecting the knife and said clutch member and actuated by contact of the fillet with the clutch member to bring the knife into engagement with the fillet.

6. In a device of the class described, a pair of rollers adapted to engage the skin of a fish therebetween, a knife remotely positioned, and means to bring the knife through the fillet and into contact with the skin whereby the fillet passes over the knife while the fillet is drawn between the rollers.

7. In a machine for skinning fish fillets, supporting roller means for feeding a fillet in a predetermined path, a second roller means mounted for movement in said path, a skinning knife or the like for removing the skin from the fillet, means to engage a fillet between said rollers whereby to move said second named roller, and means actuated by the movement of said second named roller for bringing the skinning knife into fillet skinning position.

8. In a machine for skinning fish fillets, roller means for feeding a fillet in a predetermined path, a second roller spaced from said first named roller and mounted for movement in a curved path with the center of said first named roller as an axis, means to rotate said first named roller to convey a fish fillet toward said second named roller, and between said rollers, and means actuated by said second named roller for moving a filleting knife into filleting position.

9. A machine according to claim 7, wherein the two rollers are rotated at substantially the same peripheral speed.

10. A machine according to claim 7, in which the second named roller is grooved.

11. In a device of the class described for conveying fillets and the like, a delivery roller, a support roller adjacent the delivery roller and adapted to receive fillets supplied thereby, and a supplementary roller arranged in the angle between the support roller and the delivery roller, whereby to direct the fillets delivered to said support roller.

12. In the process of skinning fish fillets, the steps of grasping the skin, moving the fillet in a predetermined path, moving a remotely positioned skinning knife into engagement with the fillet to sever the skin therefrom, and reciprocating the knife laterally during engagement with the fillet.

13. In a machine for skinning fish fillets, means for grasping the skin and moving the fillet in a predetermined path, and means for moving a remotely positioned knife into engagement with the fillet to sever the skin therefrom.

RUDOLF BAADER.
KARL FRIEDRICH SCHLICHTING.